United States Patent
Fujinami et al.

(10) Patent No.: US 10,750,098 B2
(45) Date of Patent: Aug. 18, 2020

(54) IMAGE PROCESSING DEVICE, IMAGE PROCESSING METHOD, AND IMAGE PROCESSING CIRCUIT

(71) Applicant: Panasonic Intellectual Property Management Co., Ltd., Osaka (JP)

(72) Inventors: Nobutoshi Fujinami, Osaka (JP); Shigeru Furumiya, Osaka (JP); Yoshihito Ohta, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/317,094

(22) PCT Filed: Sep. 27, 2017

(86) PCT No.: PCT/JP2017/034848
§ 371 (c)(1),
(2) Date: Jan. 11, 2019

(87) PCT Pub. No.: WO2018/070240
PCT Pub. Date: Apr. 19, 2018

(65) Prior Publication Data
US 2019/0306399 A1 Oct. 3, 2019

(30) Foreign Application Priority Data
Oct. 13, 2016 (JP) .................................. 2016-201721

(51) Int. Cl.
*H04N 5/235* (2006.01)
*H04N 5/355* (2011.01)
(Continued)

(52) U.S. Cl.
CPC ........... *H04N 5/2355* (2013.01); *G06T 5/007* (2013.01); *G06T 5/50* (2013.01); *H04N 5/144* (2013.01);
(Continued)

(58) Field of Classification Search
CPC ............. H04N 5/2355; H04N 5/35554; H04N 5/35581; H04N 5/232; H04N 5/235;
(Continued)

(56) References Cited

U.S. PATENT DOCUMENTS 6,452,972 B1 * 9/2002 Ohara .................... H04N 7/012
   348/E5.065
6,720,993 B1 * 4/2004 Hwang .................. H04N 5/235
   348/208.13
(Continued)

FOREIGN PATENT DOCUMENTS

| EP | 2297939 B1 | 4/2018 |
| JP | 2002-190983 | 7/2002 |

(Continued)

OTHER PUBLICATIONS

International Search Report of PCT application No. PCT/JP2017/034848 dated Dec. 26, 2017.
(Continued)

*Primary Examiner* — Albert H Cutler
(74) *Attorney, Agent, or Firm* — Greenblum & Bernstein, P.L.C.

(57) ABSTRACT

An image processing device configured to synthesize a first image and a second image shot in two or more exposure times different in length in a parallel way within one frame time, includes: a level adjuster configured to adjust the first image and output a corrected first image having a luminance level substantially aligned with a luminance level of the second image; a movement detector configured to calculate
(Continued)

absolute values of differences between positionally corresponding pixel pairs in the corrected first image and the second image and accumulate the calculated absolute value on an image block basis to obtain a movement detection amount on the image block basis; a movement blending ratio calculator configured to smoothen the amounts of detected movement and calculate a movement blending ratio between positionally corresponding pixel pairs based on the smoothened amounts of detected movement; and an image synthesizer configured to generate a movement-adaptive image by synthesizing pixels at the corresponding positions at the movement blending ratio.

7 Claims, 9 Drawing Sheets

(51) Int. Cl.
  *H04N 5/14* (2006.01)
  *H04N 7/18* (2006.01)
  *H04N 5/232* (2006.01)
  *G06T 5/00* (2006.01)
  *G06T 5/50* (2006.01)

(52) U.S. Cl.
  CPC .............. *H04N 5/232* (2013.01); *H04N 5/235* (2013.01); *H04N 5/35554* (2013.01); *H04N 5/35581* (2013.01); *H04N 7/18* (2013.01); *G06T 2207/10004* (2013.01); *G06T 2207/10144* (2013.01); *G06T 2207/20208* (2013.01)

(58) Field of Classification Search
  CPC ...... H04N 7/18; H04N 5/144; H04N 5/23232; H04N 5/355; H04N 5/35536; H04N 5/35545; H04N 5/35572; G06T 5/50; G06T 5/007; G06T 2207/20208; G06T 2207/10144; G06T 2207/10004
  See application file for complete search history.

(56) References Cited

U.S. PATENT DOCUMENTS

| | | | |
|---|---|---|---|
| 8,379,094 B2* | 2/2013 | Oh | G06T 5/50 348/208.1 |
| 8,803,985 B2* | 8/2014 | Kaizu | H04N 5/2355 348/208.4 |
| 9,460,492 B2* | 10/2016 | Takeru | G06T 5/002 |
| 2008/0088711 A1 | 4/2008 | Border et al. | |
| 2011/0222793 A1 | 9/2011 | Ueda et al. | |
| 2012/0044381 A1 | 2/2012 | Jannard et al. | |
| 2012/0086829 A1 | 4/2012 | Hohjoh | |
| 2014/0198226 A1* | 7/2014 | Lee | H04N 5/2355 348/208.1 |
| 2015/0245056 A1* | 8/2015 | Lim | H04N 19/176 375/240.16 |
| 2015/0296116 A1* | 10/2015 | Tsuzuki | H04N 5/23277 348/208.1 |
| 2016/0352995 A1* | 12/2016 | Min | H04N 5/2355 |

FOREIGN PATENT DOCUMENTS

| | | |
|---|---|---|
| JP | 2011-188277 | 9/2011 |
| JP | 2012-084960 | 4/2012 |
| JP | 2012-191360 A | 10/2012 |
| JP | 2014-229988 | 12/2014 |
| WO | 2009/153836 A1 | 12/2009 |

OTHER PUBLICATIONS

The Extended European Search Report from the European Patent Office (EPO) dated Jun. 19, 2019 for the related European Patent Application No. 17860597.8.

The Extended European Search Report from the European Patent Office (EPO) dated Mar. 2, 2020 for the related European Patent Application No. 17860597.8.

* cited by examiner (a)

| 4 | 2 | 1 | 1 | ... |
|---|---|---|---|---|
| 6 | 10 | 6 | 1 | 0 |
| 6 | 0 | 4 | 3 | ... |
| ... | 0 | 2 | ... | ... |

FIG. 9B (a)

| 4 | 2 | 2 | 1 | ... |
|---|---|---|---|---|
| 6 | 10 | 7 | 3 | 1 |
| 6 | 5 | 5 | 3 | ... |
| ... | 0 | 2 | ... | ... |

(b)

| | 4 | 3.5 | 3 | 3 | 3 | | | | |
|---|---|---|---|---|---|---|---|---|---|
| 5 | 5 | 4.5 | 4 | 4 | 3.5 | ... | ... | ... | ... |
| 6 | 6.5 | 6 | 5.5 | 5.5 | 5 | ... | ... | ... | ... |
| 7 | 7.5 | 7.5 | 7 | 7 | 7 | ... | ... | ... | ... |
| 7.5 | 8 | 9 | 8.5 | 8 | 8 | ... | ... | ... | ... |
| 8 | 8.5 | 8.5 | 9 | 9.5 | 10 | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |

IMAGE PROCESSING DEVICE, IMAGE PROCESSING METHOD, AND IMAGE PROCESSING CIRCUIT

CROSS-REFERENCE TO RELATED APPLICATIONS

This application is a U.S. national stage application of the PCT International Application No. PCT/JP2017/034848 filed on Sep. 27, 2017, which claims the benefit of foreign priority of Japanese patent application No. 2016-201721 filed on Oct. 13, 2016, the contents all of which are incorporated herein by reference.

TECHNICAL FIELD

The present disclosure relates to an image processing device configured to synthesize a plurality of images shot in a parallel way for different exposure times in length.

BACKGROUND ART

PTL 1 discloses an image synthesizing device configured to generate a synthetic image having an expanded dynamic range from a plurality of images. The image synthesizing device detects regions of a moving body included in these images by comparing a reference image with other images and determining the image in the region of the moving body included in the reference image as a moving body image. The image synthesizing device replaces the moving image region with a corresponding region of another image to generate a replacement image, and combines the replacement image and the reference image to generate a synthetic image. In this configuration, a synthetic image in which the moving body is considered is generated.

PTL 2 discloses an image processing device configured to generate a synthetic image from a plurality of images of a moving subject. The image processing device synthesizes a plurality of images according to a synthesis ratio calculated based on an evaluated value for brightness, an evaluated value for movement, and an evaluated value for contrast. In this configuration, even from images of a moving subject, a synthetic image having a natural appearance is generated.

PTL 3 discloses an image synthesizing device configured to synthesizing a plurality of images including an image of a moving subject and having different brightness. The image synthesizing device calculates movement data, which is an amount of shift between a reference image and a comparative image generated from the reference image and a non-reference image. For each of the reference image and the comparative image, the image synthesizing device calculates a pixel average for each of image blocks having a predetermined size, and determines whether the image block of the reference image is synthesized with the image block of the non-reference image associated with each other based on the movement data, based on the result of comparison between the difference between the pixel averages and a predetermined threshold. The ratio of the predetermined threshold and the ratio of synthesis of the image blocks are determined based on the pixel average of the image blocks of the reference image. In this configuration, blurring of the image is corrected, and a synthetic image with expanded dynamic range is obtained.

CITATION LIST

Patent Literature

PTL 1: Unexamined Japanese Patent Publication No. 2011-188277

PTL 2: Unexamined Japanese Patent Publication No. 2014-229988

PTL 3: Unexamined Japanese Patent Publication No. 2012-84960

SUMMARY OF THE INVENTION

The present disclosure provides an image processing device configured to synthesize a plurality of images shot in different exposure times, and provides an image processing device configured to achieve a high quality image with less burring in an image with a small-scale circuit configuration.

The image processing device of the present disclosure is an image processing device configured to synthesize a first image and a second image shot in two or more exposure times different in length in a parallel way within one frame time. The image processing device includes a level adjuster, a movement detector, a movement blending ratio calculator, and an image synthesizer. The level adjuster adjusts a luminance level of the first image and outputs a corrected first image having a luminance level substantially aligned with a luminance level of the second image. The movement detector calculates absolute values of differences between positionally corresponding pixel pairs in the corrected first image and the second image and accumulates the absolute values on an image block basis, which is a plurality of sets of continuous pixels in the corrected first image or the second image to obtain a movement detection amount in each of a plurality of image blocks. The movement blending ratio calculator smoothens the amounts of detected movement of the plurality of image blocks, and calculates movement blending ratios between positionally corresponding pixel pairs based on the movement detection amount smoothened. The image synthesizer generates a movement-adaptive image by synthesizing pixels at corresponding positions at the movement blending ratio.

The image processing device of the present disclosure implements an image processing device configured to synthesize a plurality of images shot in different exposure times, and provides an image processing device configured to achieve a high quality image with less burring in an image with a small-scale circuit configuration.

BRIEF DESCRIPTION OF DRAWINGS

FIG. 9A is a drawing for explaining smoothening between image blocks according to the third exemplary embodiment.

FIG. 9B is a drawing for explaining smoothening between the image blocks and smoothening in the image blocks according to the third exemplary embodiment.

DESCRIPTION OF EMBODIMENTS

Hereinafter, exemplary embodiments will be described in detail with reference to the drawings as appropriate. However, detailed descriptions that are more than necessary may be omitted. For example, detailed description of well-known matters and repeated description of a substantially identical structure may be omitted. Omission is aimed to prevent unnecessary redundancy of a following description, and to help those skilled in the art easily understand a following description.

Note that the attached drawings and the following description are provided by the inventors for those skilled in the art to fully understand the present disclosure, and are not intended to limit a subject matter described in the appended claims.

First Exemplary Embodiment

A first exemplary embodiment will now be described with reference to FIGS. 1 to 5.

[1-1. Configuration]

Figure 1:
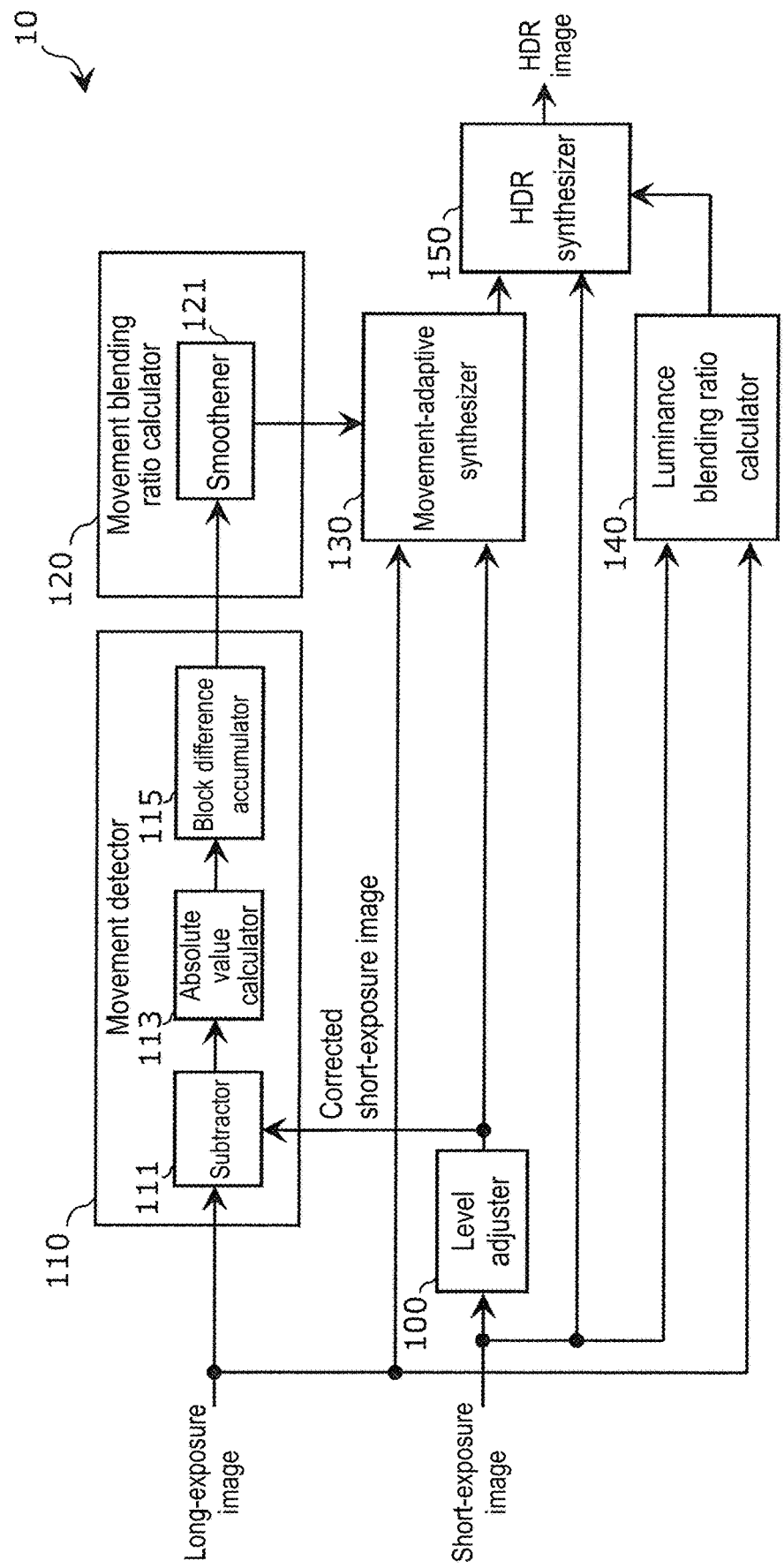
FIG. 1 is a block diagram illustrating a configuration of an image processing device according to a first exemplary embodiment.

FIG. 1 is a block diagram illustrating a configuration of image processing device 10 according to a first exemplary embodiment.

Image processing device 10 is implemented by an electronic circuit including, for example, a gate array, and is configured to synthesize a plurality of images input from an image sensor (not illustrated) and output a single image.

The plurality of images to be input means a long-exposure image and a short-exposure image illustrated in FIG. 1, are images obtained by shooting substantially same scene for different exposure times in length by a single image sensor, and in the present exemplary embodiment, examples of a first image and a second image. On these images, even a common subject of shooting appears in different brightness depending on a difference in exposure time. Image processing device 10 synthesizes these images and outputs a High Dynamic Range (hereinafter, also expressed as HDR in the respective drawings) image.

Since a difference in brightness among images appears with an increase in difference in exposure time, an HDR image having a larger dynamic range is easily obtained. Nowadays, image sensors configured to shoot an HDR moving image start to employ a drive system referred to as a Line by Line system that shoots a plurality of images in various exposure times within one frame time instead of a Frame by Frame system that shoots one image in a cycle of a vertical synchronization, that is, by changing exposure time from one frame time to another. The Line by Line system has following three merits compared with the Frame by Frame system.

(1) Intervals of Imaging a Plurality of Images are Easily Shortened

For example, in order to obtain two images, a long-exposure image and a short-exposure image with an image sensor of the Frame by Frame system, data obtained by imaging with a long exposure from a first row to a last row within one frame time (hereinafter, referred to as long-exposure data) is output, and data obtained by imaging with a short exposure from a first row to a last row (hereinafter referred to as short-exposure data) within a next one frame time is output. Therefore, a time differences between an output of the long-exposure data and an output of the short-exposure data of the respective rows are constant within one frame time regardless of a length of a short exposure time. In other words, an output of a full data of all rows in each exposure time, that is, intervals between imaging and imaging for one image are constant within one frame time.

In contrast, in an image sensor of the Line by Line system, upon completion of an output of the long-exposure data of the first row, imaging of the first row with short exposure is stared. In this manner, completion of the imaging with short exposure is before completion of the output of the long-exposure data of the last row. From then onward, upon completion of the output of the long-exposure data in each row to the last row, imaging with short exposure starts. Therefore, a time difference between the output of the long-exposure data and the output of the short-exposure data of each row is substantially equal to a length of the short exposure time, and the intervals between imaging and imaging of one image are also the same. Upon completion of imaging with short exposure, imaging with long exposure that belongs to the next frame time is started, and from then onward, imaging with long exposure and imaging with short exposure are performed alternately. In other expression, imaging of the long-exposure image and imaging of the short-exposure image are performed in different frame time in the image sensor of the Frame by Frame system and not performed in a parallel way, while in the image sensor of the Line by Line system, imaging of the long-exposure image and imaging of the short-exposure image are performed in a parallel way within one frame time. For shooting of a plurality of images under different exposure conditions in the HDR image synthesis, the shorter the temporal intervals, the smaller the difference in position of a subject or (a camera provided with) an image sensor, and thus matching degree of the images increases, and a high quality HDR image is easily obtained.

(2) Exposure Time of Long-Exposure Image is Easily Increased

Supposing that an HDR moving image of 30 fps is shot and an HDR image is generated from the long-exposure image and the short-exposure image in each frame. With an image sensor of the Frame by Frame system, one set of images needs to be output for each exposure time at every 1/30 seconds, and images are shot substantially at 60 fps. In other words, an upper limit of the exposure time for the long-exposure image is 1/60 seconds. In contrast, in the image sensor of the Line by Line system, only the long-exposure data and the short-exposure data need to be output in 1/30 seconds per row, and the upper limit of the exposure time for the long-exposure image is not limited to 1/60 seconds. For example, if the ratio between the exposure time for the long-exposure image and the exposure time for the short-exposure image in one frame time is 2:1, the exposure time for the long-exposure image is 1/45 seconds. In practice, the ratio of the exposure time for the long-exposure image per one frame time may be higher.

In this manner, with the Line by Line system, the exposure time for the long-exposure image is increased to easily make the difference from the short-exposure image larger, and thus an HDR image with a larger dynamic range is easily obtained. Even when variations in exposure time are further increased for acquiring an adequate image according to various brightness of the subject, effect of the long-exposure image on the exposure time is smaller than that in the Frame by Frame system. Supposing that the HDR moving image of 30 fps is shot in three stages of exposure times, the upper limit of the longest exposure time does not exceed 1/90 seconds with the image sensor of the Frame by Frame system.

(3) Circuit Scale is Easily Reduced

The image sensor of the Frame by Frame system requires a frame memory for temporarily store images shot in respective exposure times on the output data receiving side until synthesis is done. In contrast, in the image sensor of the Line by Line system, the synthesis can be started before all the images shot in the respective exposure times are ready, and thus need of the frame memory is eliminated. Therefore, the circuit scale can be reduced, and power consumption can be reduced correspondingly.

In this manner, the image sensor of the Line by Line system is advantageous for enlargement of the dynamic range. However, the longer the exposure time, the more the probability of change of the relative position between the subject and the camera unless both are fixed, and thus shot images are susceptible to blurring due to movement or due to camera shaking (hereinafter, referred to also as "blurring" collectively). Images including significant blurring are not suitable depending on applications. For example, for electronic mirror, blurring may cause lowering of accuracy of drivers' recognition of surroundings and for detection of substances in the environment for example, for self-driving cars, accuracy of detection is lowered. Both cases pose safety issues. For driving recorder, blurring may cause difficulties in assessment of the situation of accident and recognition of characteristics of a driver or a vehicle on the other side and recognition of vehicle number.

Note that the image processing device of the present disclosure can be applied to synthesis of images output from the image sensors of the Line by Line system as described above. However, applicable image sensors are not limited thereto. For example, the image processing device of the present disclosure can also be applied to synthesis of images output from the image sensors of a Global Shutter system.

As illustrated in FIG. 1, image processing device 10 includes level adjuster 100, movement detector 110, movement blending ratio calculator 120, movement-adaptive synthesizer 130, luminance blending ratio calculator 140, and high dynamic range synthesizer (hereinafter, expressed as HDR synthesizer) 150. Image processing device 10 receives a long-exposure image and a short-exposure image from an image sensor. The long-exposure image is input to movement detector 110, movement-adaptive synthesizer 130, and luminance blending ratio calculator 140, and the short-exposure image is input to level adjuster 100, luminance blending ratio calculator 140, and HDR synthesizer 150.

Level adjuster 100 adjusts a luminance level of the short-exposure image input from the image sensor, and outputs the adjusted short-exposure image as a corrected short-exposure image adjusted substantially to the luminance level of the long-exposure image. More specifically, level adjustor 100 increases a gain of a signal indicating the short-exposure image and outputs a signal indicating the corrected short-exposure image. The output corrected short-exposure image is input to movement detector 110 and movement-adaptive synthesizer 130 described later.

Movement detector 110 detects movement of a subject appearing in an image. Movement detector 110 includes subtractor 111, absolute value calculator 113, and block differential accumulator 115.

Subtractor 111 calculates and outputs a difference between the long-exposure image input to movement detector 110 from the image sensor and the corrected short-exposure image input from level adjuster 100. More specifically, the signal indicating the long-exposure image and the signal indicating the corrected short-exposure image originated from the same image sensor are used to output a difference obtained by subtracting a pixel value of a pixel located at a corresponding position to a target pixel in the corrected short-exposure image from a pixel value of the target pixel of the long-exposure image. Subtracting and outputting the difference are performed for each of pixel pair located at the corresponding positions between the long-exposure image and the corrected short-exposure image. The differences output from subtractor 111 is input to absolute value calculator 113. Note that the long-exposure image input to movement detector 110 and the short-exposure image input to level adjuster 100 are, if the image is input from the image sensor of the above-described Line by Line system, a long-exposure image and a short-exposure image shot in a parallel way within the same frame time.

Absolute value calculator 113 outputs an absolute value of the difference input from subtractor 111 and outputs the absolute value to block differential accumulator 115. Processing to be performed on signals in the circuit is rectifying signals from subtractor 111. The absolute value of the difference as described above indicate a magnitude of the difference in pixel value between pixels located at the corresponding positions in the long-exposure image and the short-exposure image.

Block differential accumulator 115 accumulates and outputs the difference (absolute value) input from absolute value calculator 113 on an image block basis. The image block is a region composed of a set of a plurality of continuous pixels obtained by dividing the long-exposure image or the short-exposure image into squares having a predetermined size. The amount of movement of the subject of the long-exposure image generated within the exposure time increases with an increase of the difference from the short-exposure image due to blurring of the image of the subject in the long-exposure image. Therefore, the amount of movement of the subject increases with an increase of the cumulative value on the image block basis. The cumulative value is output as the amount of movement of the detected subject (hereinafter, referred to as "movement detection amount"). Since the image of the moved subject is blurred and is expanded over a certain range, even the amount of movement accumulated on the image block basis having an adequate size indicates the movement of the subject in the image accurately to some extent. Note that the size of the image block described above is determined as appropriate depending on an angle of field, a number of pixels, accuracy and processing speed required for that application of the imaging device including image processing device 10.

In movement detector 110, respective components fulfill their own functions, so that a movement detection amount according to the amount of movement of the subject is obtained from the long-exposure image and the short-exposure image shot in a parallel way within one frame time and is output.

Movement blending ratio calculator 120 inputs the movement detection amount calculated on the image block basis and calculates the blending ratio between pixels located at the identical positions of the long-exposure image and the short-exposure image with each other based on the movement detection amount. Movement blending ratio calculator 120 first smoothens the movement detection amount of the image blocks. More specifically, a difference in movement detection amount between adjacent image blocks is segmentalized, and the movement detection amount of each pixel is interpolated so that the difference is distributed depending on a distance of each pixel from a center of gravity of the image block. Next, movement blending ratio calculator 120 calculates a blending ratio between pixels so that a blending ratio of the short-exposure image has a positive correlation with the movement detection amount indicating the movement of the subject. This is because the subject image of the long-exposure image is highly probably blurred in the image block detected to have a large movement. Here, variations in movement detection amount between pixels are smooth across a boundary between image blocks as a result of smoothening described above, and thus a calculated blending ratio between pixels varies smoothly across the boundary between the image blocks. In other words, the blending ratio between the long-exposure image and the corrected short-exposure image is not determined from block to bock, but from pixel to pixel and is applied. Therefore, generation of a block distortion of an image after synthesis can be reduced. The blending ratio of each pixel calculated by movement blending ratio calculator 120 (hereinafter, referred to as movement blending ratio) is output to movement-adaptive synthesizer 130.

Movement-adaptive synthesizer 130 synthesizes the long-exposure image and the corrected short-exposure image in accordance with the input blending ratio. More specifically, a pixel of the long-exposure image and a pixel of the short-exposure image are alfa blended with a function of blending ratio of each pixel. In this synthesis, the corrected short-exposure image is blended to a portion in the long-exposure image having a significant blurring at an adaptively high ratio. On the other hand, for a portion in the long-exposure image having a little blurring, the corrected short-exposure image is blended at a low ratio. The corrected short-exposure image is inferior in S/N ratio to the long-exposure image. Therefore, useless deterioration of image quality is avoided in the long-exposure image in a portion having a little blurring. The image obtained in this manner is referred to as movement-adaptive image hereinafter. Movement-adaptive synthesizer 130 is an example of an image synthesizer of the present exemplary embodiment.

The movement-adaptive image is output from movement-adaptive synthesizer 130 to HDR synthesizer 150, and is alfa blended with the short-exposure image by HDR synthesizer 150 by using a luminance blending ratio calculated by luminance blending ratio calculator 140 based on the long-exposure image and the short-exposure image, or on one of pixel values. Accordingly, an HDR image adaptive to both of the movement of the subject and the luminance of each pixel of the image is generated. HDR synthesizer 150 is an example of an image synthesizer of the present exemplary embodiment.

In image processing device 10 described above, movement detection is performed by comparison between the long-exposure image and the short-exposure image shot in a parallel way within one frame time. For example, a method of choosing candidates of pixels that constitute the image of the moving subject based on the result of comparison between the difference in pixel value and a predetermined threshold, and identifying a region where the image of the subject moved based on continuity of the candidate pixels is proposed in the related art. In this method, a frame memory is required for performing comparative determination of all the pixels with respect to the threshold once. However, image processing device 10 eliminates a need of the frame memory because accumulation of values indicating amount of movement on the image block basis, which is a set of continuous pixels, completes a job instead of specifying the region where the image of the moving subject is formed. In addition, the blurring of the long-exposure image associated with the detected movement is eliminated by using the pixel data of the short-exposure image shot in a parallel way. In other components as well, an image shot in a certain frame time is not reused for processing of another image shot in following frame times. Therefore, the processing performed by image processing device 10 does not require the frame memory for storing images of frames in the past and the frame memory for storing the entire image once in an intermediate stage from an input of a long and short-exposure images in one frame time to an output of an image as a result of movement-adaptive processing and HDR processing. With image processing device 10 configured as described above, the frame memory is not required, and thus a circuit scale can be reduced and manufacturing costs can also be reduced correspondingly. As the frame memory is not used, power consumption can be reduced, and thus a more stable operation than the image processing device of the related art can be achieved even on an automotive vehicle or an automatic operation vehicle which tends to be operated under a severe environment in terms of temperature, for example. For electronic mirrors for vehicles or automotive vehicles or object recognition, a real-time property of an output content such that light actually entering the image sensor is presented in a recognizable state for a driver or an algorithm of object recognition leads to achievement of operational safety. Image processing device 10 having the configuration as described above is capable of outputting the image data with such a real time property, and can achieve higher safety in such applications.

[1-2. Operation]

Figure 2:
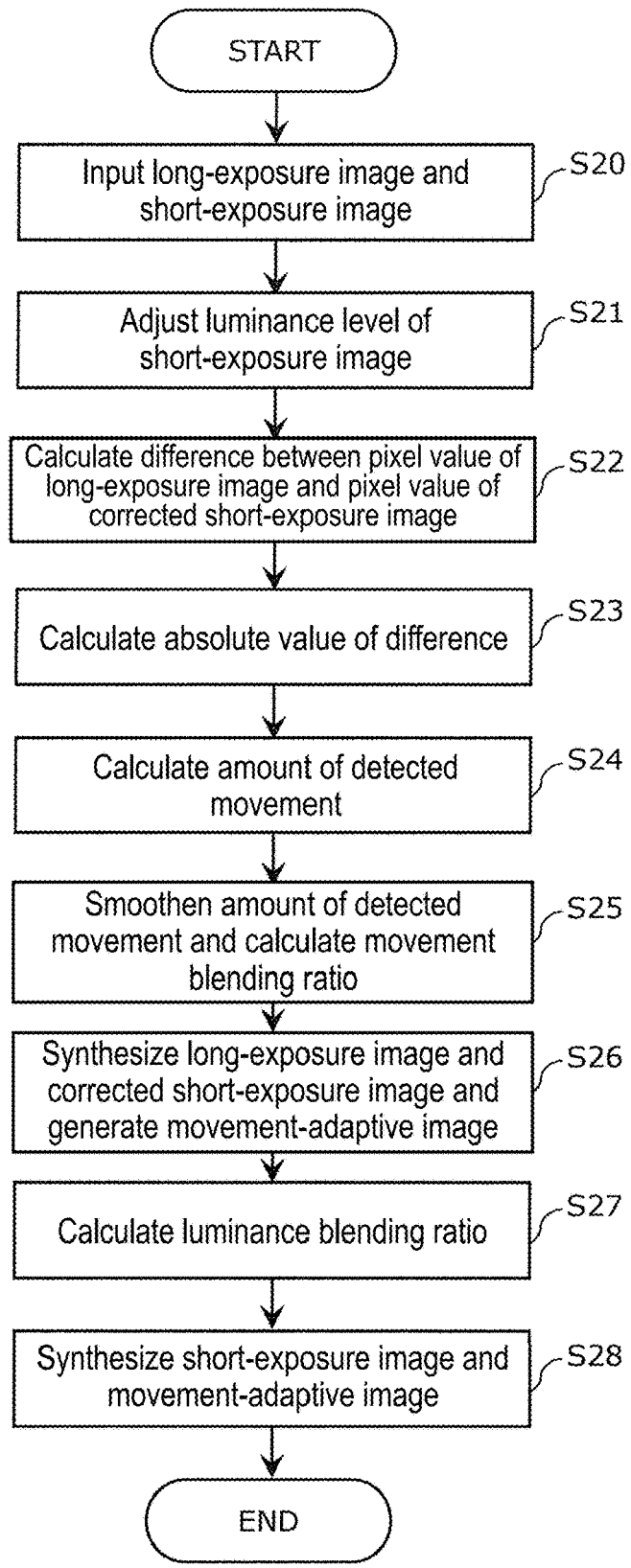
FIG. 2 is a flowchart illustrating an example of an operation procedure of the image processing device according to the first exemplary embodiment.

An operation procedure of image processing device 10 having the above configuration will be described through below. FIG. 2 is a flowchart illustrating an example of an operation procedure of image processing device 10.

At the same time, the states of an image in respective procedures will be schematically illustrated. In the respective procedures, images are not necessarily generated as images for one frame. The illustrated images are shown by assuming a case of monitoring the image at the time for understanding the present disclosure.

First of all, image processing device 10 receives inputs of a long-exposure image and a short-exposure image from an image sensor (Step S20).

Figure 3A:
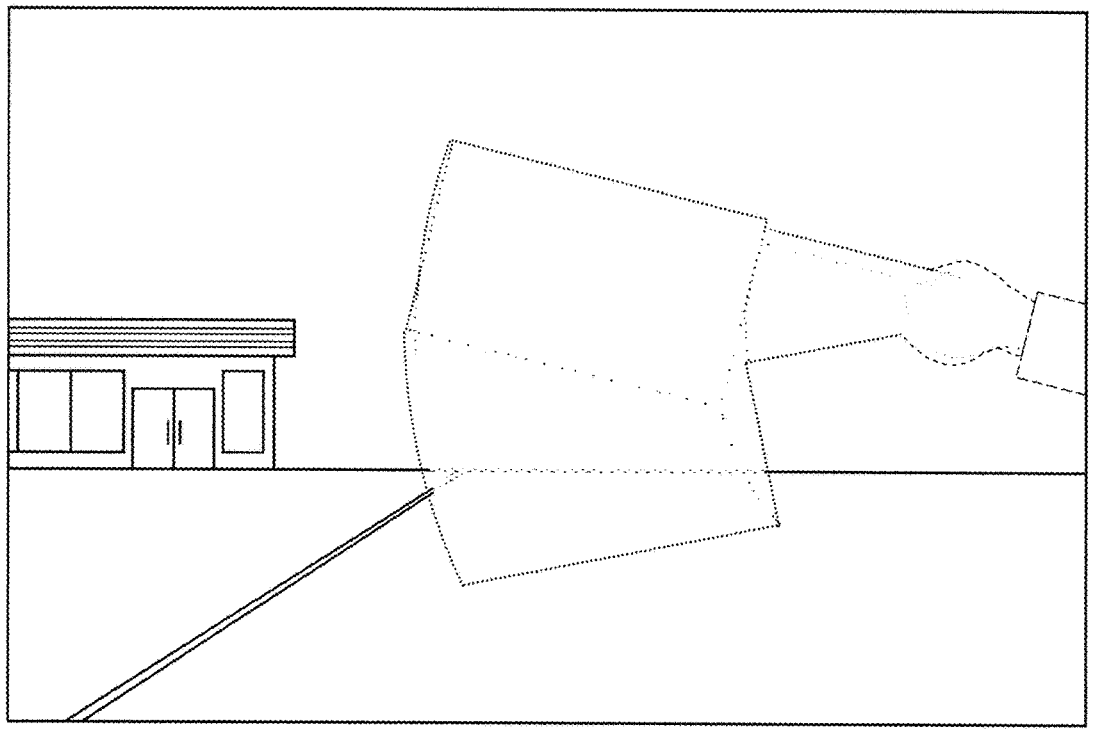
FIG. 3A is a schematic drawing illustrating an example of an image to be processed by the above-described processing procedure.
Figure 3B:
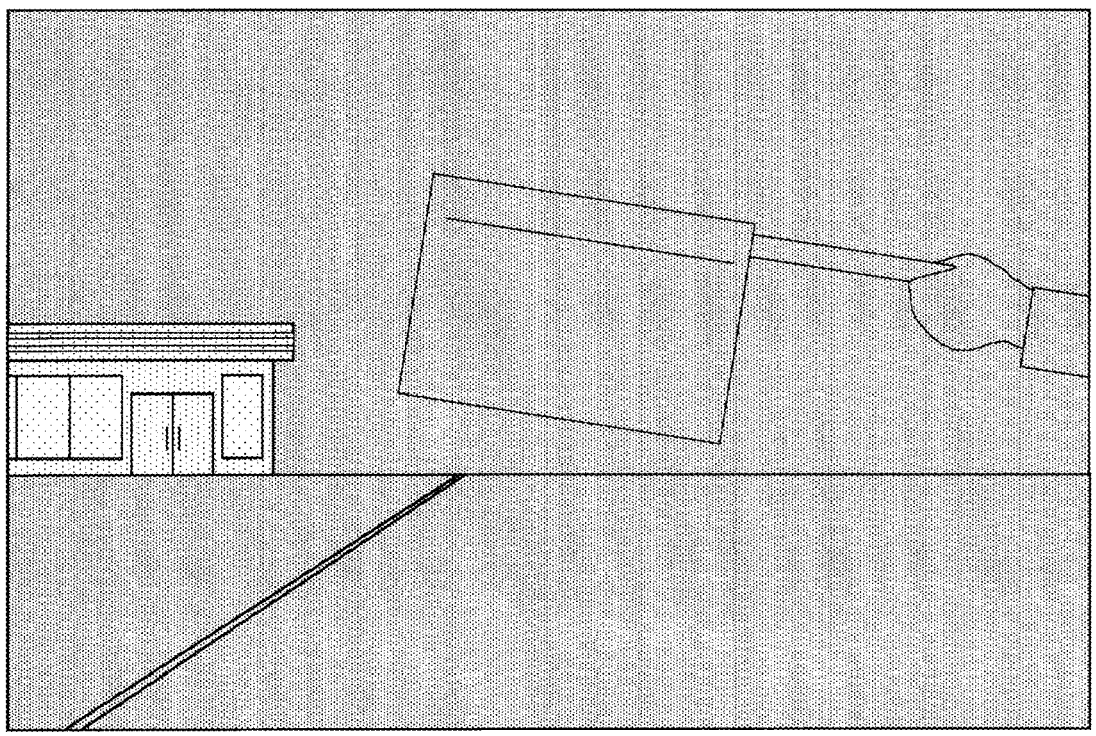
FIG. 3B is a schematic drawing illustrating an example of an image to be processed by the above-described processing procedure.

FIG. 3A is a schematic drawing illustrating an example of the long-exposure image to be input to image processing device 10 for processing. FIG. 3B is a schematic drawing illustrating an example of the short-exposure image to be processed by image processing device 10 for processing. In these drawings, the long-exposure image and the short-exposure image assumed to be taken by an image sensor driven by the Line by Line system within one frame time and input into image processing device 10 are schematically shown.

The long-exposure image is brighter than the short-exposure image as a whole. However, an image of a subject moving during a long exposure time, in this example, an image of a hand in a near view and a flag held by the hand and slightly moved upward is blurred. In this schematic drawing, a contour of a blurred image is illustrated by a dotted line or a broken line. In contrast, no blurring is found in a road and a building farther than the hand and the flag. A contour of the image not blurring is illustrated by a solid line.

The short-exposure image is darker than the long-exposure image as a whole. In this schematic drawing, a darker portion is illustrated by halftone dots having various concentrations. Portion having low concentration means to be brighter than portions with high concentration. For example, the halftone dots of a window portion of a building which used to be bright by transmitting or reflecting light at the time of shooting are paler than other portions. In the short-exposure image, the image of the subject appears without substantial blurring. A range of the image of the subject in the short-exposure image is included within a range of the image of the subject in the long-exposure image. This is because the long-exposure image and the short-exposure image are shot in a parallel way within the same frame time by one image sensor.

Subsequently, a luminance level of the short-exposure image is adjusted by level adjuster 100, and a corrected short-exposure image with a luminance level adjusted to substantially match the luminance level of the long-exposure image is output (Step S21). A width of increase of the luminance level in this step is determined based on exposure times and magnitudes of gains of output signals of each of the long-exposure image and the short-exposure image. The corrected short-exposure image is input to movement detector 110.

Figure 4:
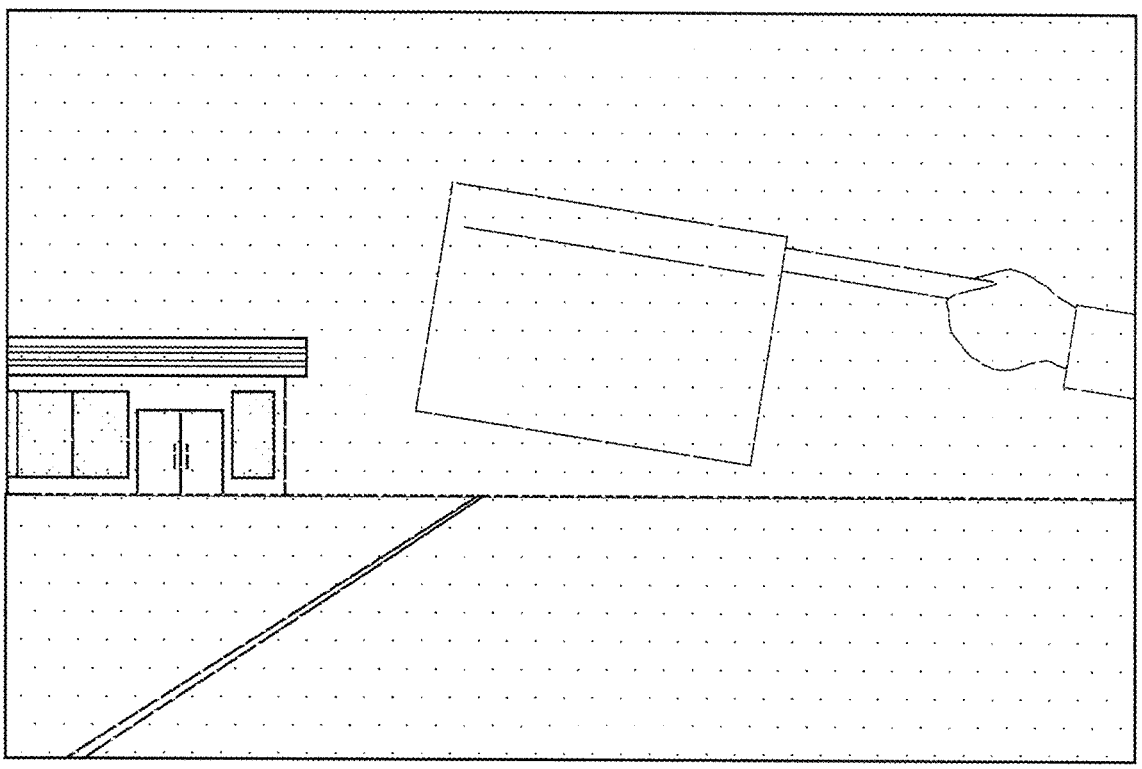
FIG. 4 is a schematic drawing illustrating an example of an image monitored in an intermediate stage of the above-described processing procedure.

FIG. 4 is a schematic drawing of the corrected short-exposure image output in Step S21. Compared with the short-exposure image before correction, the corrected short-exposure image has brightness substantially equal to the brightness of the long-exposure image as a whole. However, noise is prominent due to amplification for raising the luminance level, and image quality is lower than the long-exposure image. In FIG. 4, the noise is schematically illustrated by a white or black point.

Subsequently, in movement detector 110 having an input of the corrected short-exposure image, subtractor 111 calculates a difference between a pixel value of the long-exposure image and a pixel value of the corrected short-exposure image (Step S22). Since the luminance levels are substantially aligned in Step S21, significant difference is extracted from pixels in a portion having difference in presence or absence of blurring in the image in Step S22.

Next, absolute value calculator 113 calculates absolute values of differences in pixel values of pixels located at a corresponding position in the long-exposure image and the corrected short-exposure image as the differences include values with opposite signs due to a magnitude relationship (Step S23). Accordingly, the magnitudes of difference in pixel values between the long-exposure image and the corrected short-exposure image are digitized. When the position of a subject viewed from a position of the image sensor changes during the exposure time, the position of the corresponding subject on the image changes correspondingly. Therefore, the difference in pixel value between each pixel pair at corresponding positions in the long-exposure image and the corrected short-exposure image is most probably large. Using this nature, in the present disclosure, the absolute values calculated in Step S23 are used as values indicating the magnitude of movement of the subject in the exposure time for shooting the long-exposure image.

Next, block differential accumulator 115 accumulates the absolute values of the differences in pixel value calculated by absolute value calculator 113 on the image block basis composed of a set of continuous pixels. Accordingly, the differences in pixel value between the long-exposure image and the corrected short-exposure image are accumulated on the image block basis. In other words, the amounts of movement are detected on the image block basis in this operation (Step S24). Since the image of the moved subject is blurred and is expanded over a certain range, even the result of aggregation on an image block basis indicates the amount of movement of the subject in each position in the image accurately to some extent. In addition, a required amount of memory region can be saved compared with a case where the amount of movement of the subject is handled with the difference on a pixel basis, and a difference between the presence and absence of the noise in the respective pixels is buried to some extent.

Figure 5:
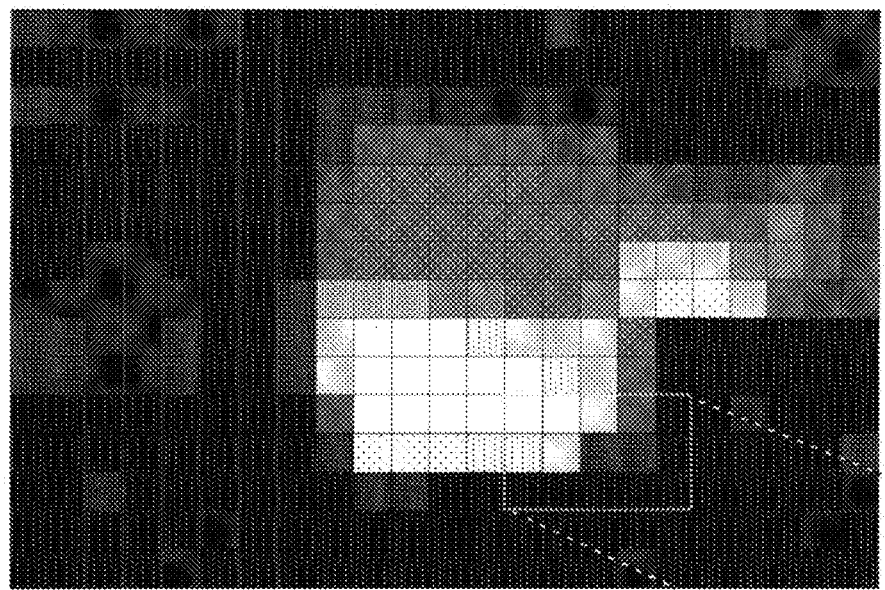
FIG. 5 is a schematic drawing illustrating an example of an image monitored in an intermediate stage of the above-described processing procedure.
Figure 5:
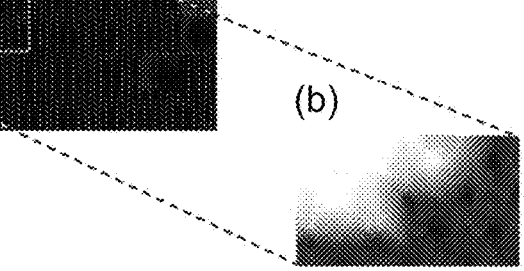

FIG. 5 is a schematic drawing illustrating an example of distribution of amounts of movement of an image, which is output by block differential accumulator 115, in one frame obtained by monitoring signals indicating amounts of movement on the image block basis. The schematic drawing in part (a) of FIG. 5 illustrates signals corresponding to a size of the long-exposure image or the corrected short-exposure image, and each square in the drawing indicates an image block. In this example, image blocks having a large amount of movement, that is, image blocks having a large difference in pixel value between the long-exposure image and the corrected short-exposure image are brighter.

Next, movement blending ratio calculator 120 smoothens the movement detection amount of the image blocks. Accordingly, the differences in movement detection amount between adjacent image blocks are segmentalized into multiple stages and distributed (interpolated) from pixels at relative positions with respect to boundaries between the image blocks to pixels located at centers of gravity of the image blocks, and the movement detection amount of each pixel is determined. Part (b) of FIG. 5 is a schematic drawing illustrating an example of distribution of the amount of movement in a part (within a frame of a broke line) of the image in one frame obtained by monitoring a signal indicating the movement detection amount after smoothening of the image blocks in part (a) of FIG. 5. In this schematic drawing, the amount of movement is indicated by concentration of hatching and changes smoothly across the boundary between the image blocks compared with part (a) before smoothening. A movement blending ratios of the respective pixels are calculated based on the movement detection amount of the respective pixels (Step S25).

The operation of movement blending ratio calculator 120 has been described thus far. Subsequently, movement-adaptive synthesizer 130 blends the long-exposure image and the corrected short-exposure image at a movement blending ratio calculated in Step S25. Accordingly, a movement-adaptive image is generated by blending a low ratio of pixels of the corrected short-exposure image with pixels constituting an image having a little blurring in the long-exposure image, and blending a high ratio of pixels of the corrected short-exposure image with pixels constituting an image having a significant blurring in the long-exposure image (Step S26). For portions having no blurring, pixels of the long-exposure image may be used as-is.

In the movement-adaptive image obtained in this manner, an image having no blurring or a little blurring is configured by dominantly using pixels of the long-exposure image having a high S/N ratio, and an image having a significant blurring is configured by enhancing dominancy of the pixels of the corrected short-exposure image. Therefore, the movement-adaptive image is a high quality image as a whole in terms of easiness of recognition of the subject by a person or object sensing algorithm.

In the procedure described above, expansion of the dynamic range of luminance is not performed. A blending ratio of the long-exposure image and the short-exposure image for expanding the dynamic range of luminance (luminance blending ratio) is calculated by luminance blending ratio calculator 140 by using a known technique (Step S27). The movement-adaptive image and the short-exposure image are synthesized by HDR synthesizer 150 at this luminance blending ratio, and an HDR image with higher quality is generated (Step S28).

Step S27, being shown at a last place in a flowchart in FIG. 2, may be implemented in a parallel way to the procedure up to Step S26.

[1-3. Advantageous Effects]

As described above, in the present exemplary embodiment, image processing device 10 configured to synthesize the short-exposure image and the long-exposure image shot in two or more exposure times different in length in a parallel way within one frame time includes level adjuster 100, movement detector 110, movement blending ratio calculator 120, and movement-adaptive synthesizer 130.

Level adjuster 100 adjusts a luminance level of the short-exposure image and outputs a corrected short-exposure image having a luminance level substantially aligned with a luminance level of the long-exposure image.

Movement detector 110 calculates absolute values of differences in pixel values between positionally corresponding pixel pairs located at corresponding positions in the corrected short-exposure image and the long-exposure image. The absolute value is then accumulated on the image block basis to obtain the movement detection amount of the respective image blocks. The image block is a set of a plurality of continuous pixels of the corrected short-exposure image or the long-exposure image.

Movement blending ratio calculator 120 smoothens the amounts of detected movement of the plurality of image blocks, and calculates movement blending ratios between the pixels at the corresponding positions based on the movement detection amount after smoothening.

Movement-adaptive synthesizer 130 generates a movement-adaptive image by synthesizing pixels at the corresponding positions at this movement blending ratio.

More specifically, movement blending ratio calculator 120 calculates a movement blending ratio so that the ratio of pixels of the short-exposure image to be synthesized with pixels of the long-exposure image increases with an increase of the movement detection amount after smoothening.

Accordingly, blending is performed so that pixel values of the short-exposure image with a little blurring are reflected to the long-exposure image so as to be adapted to the degree of blurring in the image indicated by the movement detection amount on the image block basis within the long-exposure image. Specifically, pixel values of the short-exposure image are reflected at a higher rate to pixels of an image with a significant blurring. The degree of reflection is determined based on the movement detection amount after smoothening, and thus block distortion including the difference in movement detection amount between the adjacent image blocks appearing on the synthetic image is reduced.

In this manner, a movement-adaptive image easy to recognize the subject by a person or object sensing algorithm as a whole is generated.

In the present exemplary embodiment, image processing device 10 may further include luminance blending ratio calculator 140 and HDR synthesizer 150.

Luminance blending ratio calculator 140 calculates luminance blending ratios between positionally corresponding pixel pairs from the short-exposure image and the long-exposure image.

HDR synthesizer 150 synthesizes pixels at the corresponding positions in the movement-adaptive image and the short-exposure image at this luminance blending ratio.

Accordingly, blurring is reduced, the dynamic range of luminance is expanded, and in addition, an HDR image suitable for easy recognition of the subject is generated.

Second Exemplary Embodiment

A second exemplary embodiment will now be described herein with reference to FIGS. 6 and 7.

[2-1. Configuration]

Figure 6:
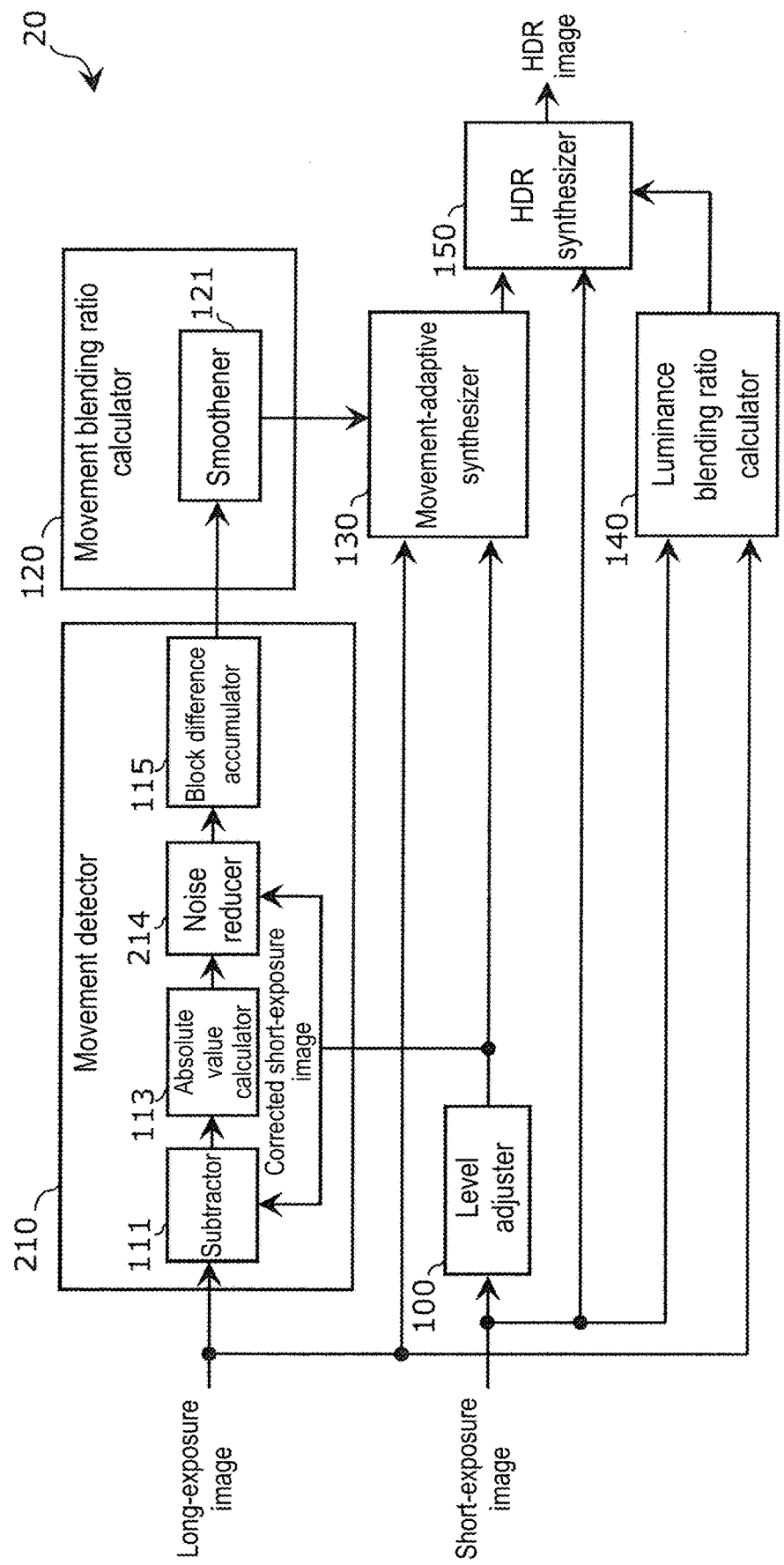
FIG. 6 is a block diagram illustrating a configuration of an image processing device according to a second exemplary embodiment.

FIG. 6 is a block diagram illustrating a configuration of image processing device 20 according to the second exemplary embodiment. Note that components common with the first exemplary embodiment are denoted by common reference signs with FIG. 1. Description of points common with the first exemplary embodiment will be given briefly or omitted, and different points from the first exemplary embodiment will mainly be described.

Image processing device 20 according to the second exemplary embodiment is different from image processing device 10 according to the first exemplary embodiment in that movement detector 210 is provided instead of movement detector 110.

Movement detector 210 is provided with noise reducer 214 in addition to the configuration of movement detector 110.

Noise reducer 214 receives an input of a signal indicating an absolute value of difference between the long-exposure image and the corrected short-exposure image from absolute value calculator 113, and reduces noise contained in the signal.

As used herein the term "noise" is, for example, a spike on a signal, has a pixel value significantly different from pixels in the periphery on the image, and appears as pixels lack of, or poor apparent continuity with peripheral pixels. This noise is caused by noise contained, for example, in the corrected short-exposure image as illustrated in FIG. 4. However, images output from the image sensor generally contain noise, and the noise in the present disclosure is not limited to the noise contained in the corrected short-exposure image.

The pixel values caused by such noise pushes up the absolute value of the difference irrespective of the actual movement of the subject. Consequently, the cumulative value of the image block that contains this pixel increases irrespective of the degree of blurring on the image, and in this image block the blending ratio of the corrected short-exposure image is increased. Since the corrected short-exposure image is deteriorated in S/N ratio than the long-exposure image, the image quality of the movement-adaptive image is lowered if the blending ratio is unnecessarily increased. Noise reducer 214 reduces such noise by performing threshold processing. Accordingly, adverse effects of the noise contained in the image output form the image sensor on the image quality of the movement-adaptive image is reduced.

The threshold is variable from the following reasons. Noise reducer 214 determines a threshold used for the threshold processing by using the corrected short-exposure image input from level adjuster 100.

An amplitude of the noise in the image output from the image sensor is not constant, and is small in a darker area. Therefore, an impact of noise on the difference tends to be small in each pixel in the darker area in the image, and large in each pixel in the brighter area.

When a fixed threshold is used, even an inadequate absolute value caused by noise may exceed the threshold and may be detected as movement depending on the magnitude of the threshold. When such inadequate absolute values are accumulated in one image block, the movement detection amount is increased irrespective of the actual degree of blurring. Therefore, the blending ratio of the corrected short-exposure image is increased, and thus a movement-adaptive image with much noise is generated.

Alternatively, depending on the magnitude of the threshold, not only inadequate absolute values caused by noise, but also relatively large absolute values out of the absolute values of differences caused by blurring on the image do not exceed the threshold and thus are excluded from accumulation. In this case, the movement detection amount is reduced irrespective of the actual degree of blurring. Therefore, the blending ratio of the corrected short-exposure image is reduced, and thus a movement-adaptive image with insufficient reduction of blurring is generated.

In this manner, in movement detector 210 of the present exemplary embodiment, pixels having noise are adequately extracted by using an adequate threshold according to the brightness of an area including pixels to be subjected to the threshold processing (hereinafter referred to as target pixel) for noise reduction.

In the present exemplary embodiment, when threshold processing is performed on the target pixel, noise reducer 214 determines a threshold to be used according to the luminance of at least one pixel located in the periphery of the target pixel in the corrected short-exposure image.

More specifically, a threshold preset is used according to for example, luminance values of four sides of several pixels including the target pixel, or statistically derived numerical values such as average values or intermediate values derived from the luminance values of the several pixels interposing the target pixel in the same row as the target pixel. For example, the threshold is set in a stepwise fashion corresponding to the range of the statistical value. Alternatively, the threshold may be set by being output from a function to define the statistical value as an input.

[2-2. Operation]

Figure 7:
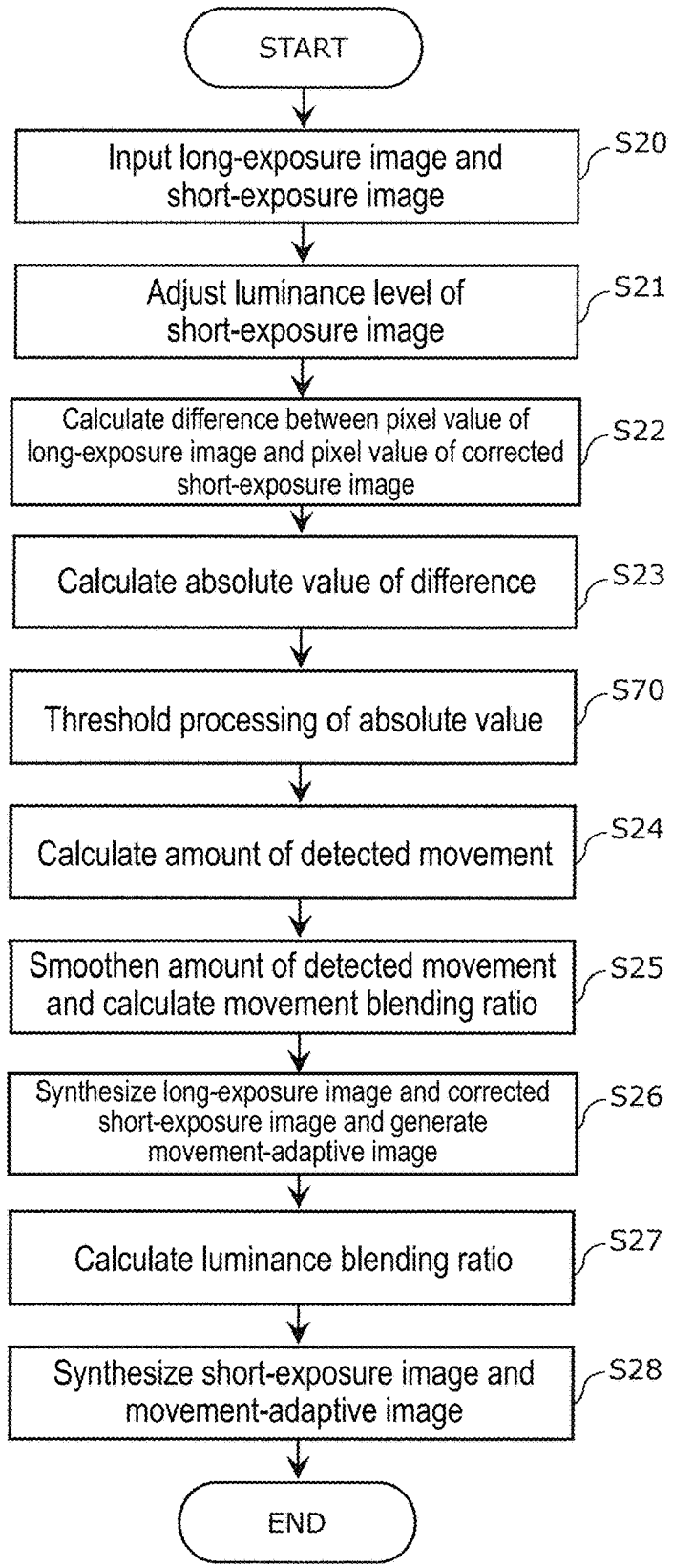
FIG. 7 is a flowchart illustrating an example of an operation procedure of the image processing device according to the second exemplary embodiment.

FIG. 7 is a flowchart illustrating an example of an operation procedure of image processing device 20. Operation of image processing device 20 will be described mainly about differences from the operation procedure of image processing device 10 according to the first exemplary embodiment.

Noise reducer 214 compares an absolute value indicated by a signal received from absolute value calculator 113 with a threshold to be used. Noise reducer 214 then performs threshold processing to avoid the absolute values that do not exceed the threshold from being inadequately accumulated in block differential accumulator 115 (Step S70). For example, noise reducer 214 may exclude the absolute values that do not exceed the threshold from a target of accumulation on the image block basis, or may replace the same by a median value including the absolute value of difference of the peripheral pixels or by an average of the absolute values of difference among the peripheral pixels.

[2-3. Advantageous Effects]

Movement detector 210 of image processing device 20 according to the present exemplary embodiment includes absolute values exceeding a predetermined threshold as targets of accumulation on the image block basis and excludes absolute values that do not exceed the threshold from targets of accumulation on the image block basis out of absolute values of differences in pixel value between positionally corresponding pixel pairs. This threshold is determined according to the luminance of pixels in the periphery of the target pixel in the corrected first image.

Accordingly, out of the absolute values of difference, adequate ones caused by blurring are accumulated on the image block basis, and inadequate ones caused by noise are reduced to calculate the movement detection amount, so that an adequate blending ratio of the corrected short-exposure image can be obtained, and lowering of image quality of the movement-adaptive image due to noise can be reduced.

Third Exemplary Embodiment

Figure 8:
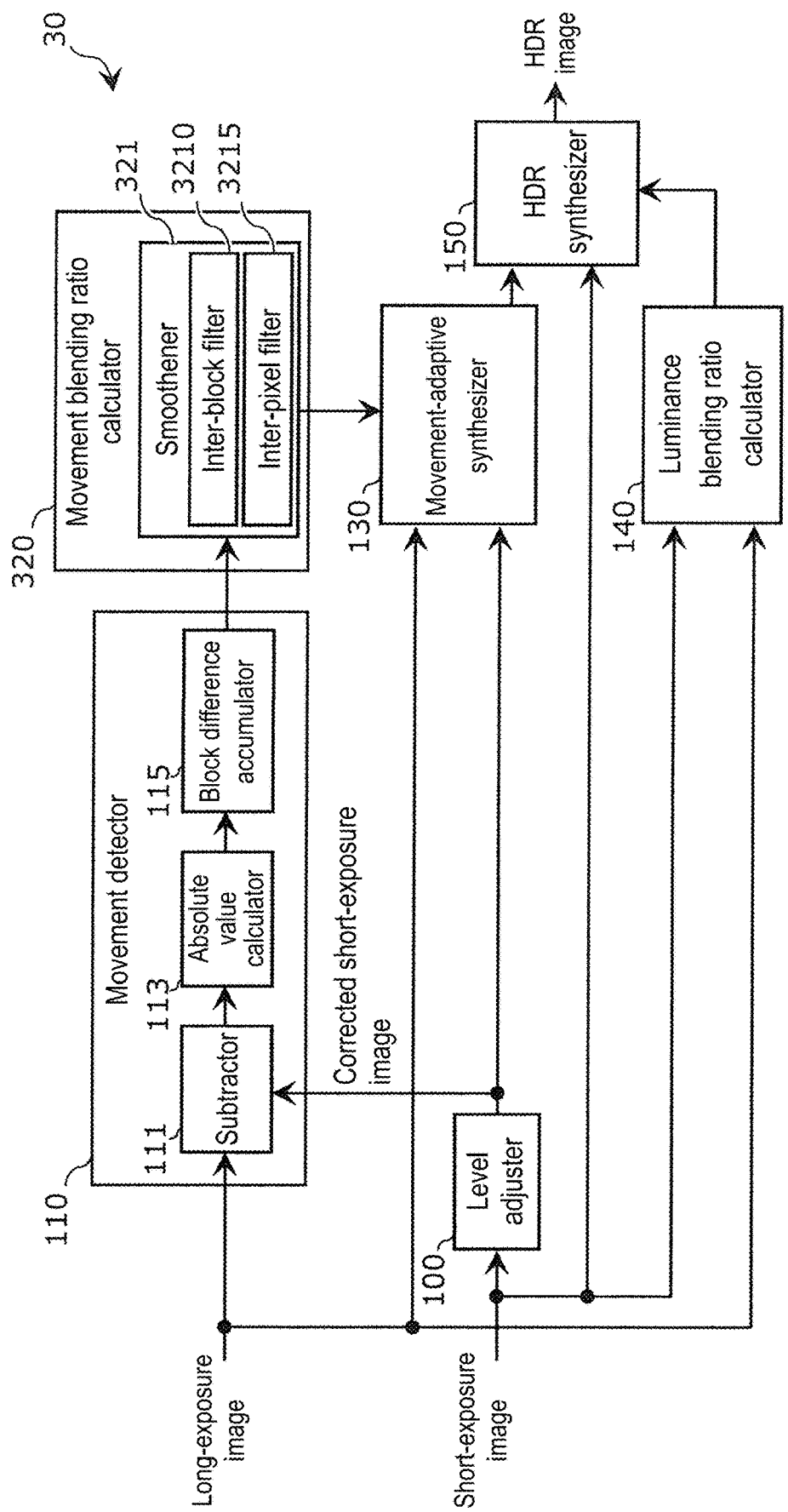
FIG. 8 is a block diagram illustrating a configuration of an image processing device according to a third exemplary embodiment.

Referring now to FIG. 8 to FIG. 9B, a third exemplary embodiment will be described below.

[3-1. Configuration]

FIG. 8 is a block diagram illustrating a configuration of image processing device 30 according to the third exemplary embodiment. Note that components common with the first exemplary embodiment are denoted by common reference signs with FIG. 1. Description of points common with the first exemplary embodiment will be given briefly or omitted, and different points from the first exemplary embodiment will mainly be described.

Image processing device 30 according to the third exemplary embodiment is different from image processing device 10 according to the first exemplary embodiment in that movement blending ratio calculator 320 is provided instead of movement blending ratio calculator 120.

Movement blending ratio calculator 320 is provided with smoothener 321 instead of smoothener 121. Smoothener 321 includes inter-block filter 3210 and inter-pixel filter 3215. Smoothener 321 performs smoothening in two stages for the movement detection amount on the image block basis with inter-block filter 3210 and inter-pixel filter 3215.

[3-2. Operation]

An operation of filtering by movement blending ratio calculator 320 using these filters is executed in Step S25 of a flowchart illustrated in FIG. 2.

Inter-block filter 3210 smoothens amounts of detected movement of the plurality of image blocks. FIG. 9A and FIG. 9B are drawing for explaining an example of smoothening with inter-block filter 3210. Squares in the drawings schematically illustrate one image block, and number in each block indicates a result of accumulation of absolute values of differences in pixels included in the image block. Three dots indicate that numbers are omitted.

For example, in FIG. 9A, when the cumulative value is "10", lower two of the image block are "0". When inter-block filter 3210 is applied to these image blocks, change in cumulative value among these three image blocks becomes gentle as illustrated in part (a) of FIG. 9B. In an image block on the right side of image block having a cumulative value "10" is on the right side, cumulative values in some image blocks are changed so that the change of the cumulative value from this block becomes gentle. Accordingly, the difference in blending ratio of the corrected short-exposure image between these image blocks is smaller than before application of the filter. Therefore, the degree of reduction of blurring or the difference in amount of noise is reduced at a position corresponding to the boundary between image blocks adjacent to each other within a movement-adaptive image, so that unnatural appearance and deterioration of accuracy of image recognition can be prevented or reduced.

In addition, inter-block filter may use not only the adjacent blocks, but also a block cumulative value in a time direction. For example, in a case where surroundings become suddenly dark at an entry or an exit of a tunnel, the absolute value of a difference between the long-exposure image and the short-exposure image of the subject is reduced, and consequently, the movement detection amount is suddenly reduced. In order to cope with an occurrence of such circumstance, a block cumulative value in the time direction is used, so that the robustness of the movement detection amount can be achieved.

In addition, in the present exemplary embodiment, inter-pixel filter 3215 is further applied to each image block. Part (b) of FIG. 9B illustrates an example of a result of smoothening the above-described image block having the cumulative value "10" with inter-pixel filter 3215.

A pixel at a center of gravity of the image block (in this example, the pixel at the center in a thick frame) is still "10" which is a cumulative value after processing with inter-block filter 3210. Cumulative values of other pixel are changed from "10" toward the cumulative value of the image blocks adjacent in the respective directions. In the adjacent image blocks, the cumulative value changes in the same manner with inter-pixel filter 3215. Consequently, the difference between pixels interposing the boundary between the image blocks indicated by a thick line is smaller than the cumulative value between the image blocks. For example, the difference between pixels interposing the boundary between the image block having a cumulative value "10" and an image block having a cumulative value "6" (the left side of the thick frame) ranges from 0 to 0.5. Likewise, the difference between pixels interposing the boundary between the image block having a cumulative value "10" and an image block having a cumulative value "2" (the upper side of the thick frame) ranges from 0.5 to 1.

For pixels in the image block, cumulative values of absolute values of differences are smoothened between pixels. Accordingly, the blending ratio of the corrected short-exposure image in the entire image changes smoothly. Since the difference in movement detection amount between the image blocks is reduced as a result of smoothening with inter-block filter 3210, changes for approximating the cumulative value of the adjacent image block, which are to be provided between the cumulative values of the respective pixels in the image block, become gentle as well. Accordingly, reduction of blurring in the movement-adaptive image and reduction of an occurrence of prominent, abrupt, and unnatural change due to a large amount of noise can be achieved.

Note that movement blending ratio calculator 320 provided with such a filter is also applicable to image processing device 20 in the second exemplary embodiment, and smoothening in two stages using the above-described two types of filters is executed in Step S25 illustrated in a flowchart in FIG. 7.

[3-3. Advantageous Effects]

Movement blending ratio calculator 320 included in image processing device 30 according to the present exemplary embodiment executes smoothening of the movement detection amount by using an inter-block smoothening filter configured to smoothen the movement detection amount on the image block basis between a plurality of image blocks located near the image block and an inter-pixel smoothening filter configure to smoothen the movement detection amount between a plurality of pixels near the target pixel.

Accordingly, the change in blending ratio of the corrected short-exposure image at a boundary between the image blocks can be reduced. In addition, a change in blending ratio of the corrected short-exposure image between pixels arranged continuously across the boundary of the image block, for example, between pixels arranged for example from the center of gravity of a certain image block to a center of gravity of an adjacent image block can be reduced. Consequently, an occurrence of a block distortion is reduced as a whole, and a movement-adaptive image in which tones change smoothly is obtained. By using such a movement-adaptive image, an HDR image having a higher accuracy of recognition of a subject by a person or algorithm can be generated.

Other Exemplary Embodiments

As described above, the first to third exemplary embodiments have been described as illustration of the technique disclosed in this application. However, the technique of the present disclosure is not limited to the first to third exemplary embodiments, but is applicable to another exemplary embodiment in which a change, a replacement, an addition, or an omission is appropriately made. In addition, the components described in the first to third exemplary embodiments can be combined to obtain a new exemplary embodiment.

Therefore, other exemplary embodiments will be described below.

For example, a technique in the present disclosure may be implemented as an image processing method including respective steps of the processing operation illustrated in a flowchart in FIG. 2 or FIG. 7 executed by image processing device 10, 20, or 30 according to the exemplary embodiments described above.

This method is implemented by a program that is executed by a computer. This program may be stored in a non-temporary recording medium such as a computer readable CD-ROM or may be delivered through communication routes such as internet.

In the above-described exemplary embodiments, a procedure up to generation of a movement-adaptive image reduced in blurring from the long-exposure image and the short-exposure image is described as if it is a pre-process independent from a procedure of generation of an HDR image having an expanded luminance dynamic range. However, the present invention is not limited thereto. Although alfa blending is performed twice for generation of the movement-adaptive image and for synthesis of the HDR image, the HDR image may be synthesized by performing the alfa blending once by inputting the long-exposure image and the short-exposure image. A coefficient used for synthesis of the HDR image in this case is acquired by coefficients used respectively in two times of alfa blending described above, and a coefficient for adjusting the luminance level by level adjuster 100.

In the exemplary embodiments described above, only two types of images, the long-exposure image and the short-exposure image are exemplified as images input from the image sensor for description. However, the technique of the present disclosure can be applied to a device, a method, an electronic circuit, and a program configured to input three or more types of images different in exposure time. For example, the image processing device of the respective exemplary embodiments is driven in the Line by Line system described above, and is capable of processing images output from the image sensor configured to image three images different in exposure time in a parallel way within one frame time.

In the exemplary embodiments described above, processing performed by movement detector 110 or 210 that targets at the long-exposure image and the corrected short-exposure image obtained by correcting the luminance level of the short-exposure image to align with the luminance of the long-exposure image has been described. However, the technique in the present disclosure is not limited thereto. The long-exposure image and the short-exposure image lowered in luminance level may be targets of processing, or luminance levels of both the short-exposure image and the long-exposure image may be adjusted and substantially aligned to be used as targets of above-described processing performed by movement detector 110 or 210.

In the exemplary embodiments described above, smoothening of the movement detection amount in movement blending ratio calculator 120 or 320 has been described. However, the technique of the present disclosure is not limited thereto. Instead of smoothening the movement detection amount, the movement blending ratio in the respective image blocks obtained based on the movement detection amount may be smoothened.

As described above, the exemplary embodiments have been described as examples of the technique according to the present disclosure. The appended drawings and the detailed description have been provided for that purpose.

Thus, some of the components described in the accompanying drawings and the detailed description may include not only components essential but also components not essential in order to illustrate the above technique. For this reason, it should not be construed that the component that are not essential are essential because the components are described in the appended drawings and the detailed description.

In addition, because the above exemplary embodiments are for exemplifying the technique in the present disclosure, various modifications, replacements, additions, removals, or the like can be made without departing from the scope of the accompanying claims or the equivalent thereof.

INDUSTRIAL APPLICABILITY

The present disclosure is applicable to an image synthesizing device configured to perform image synthesizing process adaptively according to the movement of a subject. Specifically, the present disclosure is applicable to digital still cameras, digital video cameras, and vehicle-mounted object detection systems, electronic mirrors, and driving recorders.

REFERENCE MARKS IN THE DRAWINGS

10, 20, 30: image processing device
100: level adjuster
110, 210: movement detector
111: subtractor
113: absolute value calculator
115: block difference accumulator
120, 320: movement blending ratio calculator
121, 321: smoothener
130: movement-adaptive synthesizer (image synthesizer)
140: luminance blending ratio calculator
150: HDR synthesizer
214: noise reducer
3210: inter-block filter
3215: inter-pixel filter

The invention claimed is:

1. An image processing device configured to synthesize a first image and a second image shot in two or more exposure times, the two or more exposure times being different in length, the first image and the second image being shot in a parallel way within one frame time, the image processing device comprising:
   a level adjuster configured to adjust a luminance level of the first image and output a corrected first image having a luminance level that is substantially same as a luminance level of the second image;
   a movement detector configured to calculate an absolute value of a difference in a pixel value between each pair of co-located pixels in the corrected first image and the second image and accumulate the absolute value on an image block basis, an image block being a plurality of sets of continuous pixels in the corrected first image or the second image to obtain a movement detection amount in each of a plurality of image blocks;
   a movement blending ratio calculator configured to smoothen the movement detection amount in each of the plurality of image blocks based on differences in the movement detection amount between adjacent blocks of the plurality of blocks so that a smoothened movement detection amount of each pixel is determined and calculate a movement blending ratio between each pair of the co-located pixels in the image block based on the smoothened movement detection amount of each pixel; and
   an image synthesizer configured to generate a movement-adaptive image by synthesizing the co-located pixels at the movement blending ratio.

2. The image processing device according to claim 1, wherein the movement detector determines to include the absolute value as a target of the accumulation when the absolute value exceeds a predetermined threshold, and excludes the absolute value as the target of the accumulation when the absolute value does not exceed the predetermined threshold, and
   the predetermined threshold is determined according to luminance of at least one pixel in a periphery of a target pixel in the corrected first image.

3. The image processing device according to claim 1, wherein the movement blending ratio calculator executes smoothening of the movement detection amount in each of the plurality of image blocks by using an inter-block smoothening filter configured to smoothen the movement detection amount on the image block basis between a first plurality of image blocks located near a second plurality of image blocks and an inter-pixel smoothening filter configured to smoothen amounts of detected movements between a plurality of pixels near a target pixel.

4. The image processing device according to claim 1, further comprising a luminance blending ratio calculator configured to calculate a luminance blending ratio from pixel values of each pair of the co-located pixels in the first image and the second image,
   wherein the image synthesizer generates a high dynamic range image by synthesizing the co-located pixels in the movement-adaptive image and the first image at the luminance blending ratio.

5. The image processing device according to claim 1, wherein the first image is an image shot in an exposure time shorter than for the second image, and
the movement blending ratio calculator calculates the movement blending ratio to increase a ratio of pixels of the first image to be synthesized to pixels of the second image with an increase of the smoothened movement detection amount.

6. An image processing method for synthesizing a first image and a second image shot in two or more exposure times, the two or more exposure times being different in length, the first image and the second image being shot in a parallel way within one frame time, the image processing method comprising:
outputting a corrected first image having a luminance level that is substantially same as a luminance level of the second image by adjusting a luminance level of the first image;
calculating an absolute value of a difference in a pixel value between each pair of co-located pixels in the corrected first image and the second image;
obtaining a movement detection amount in each of a plurality of image blocks by accumulating the absolute value on an image block basis, an image block being a plurality of sets of continuous pixels in the corrected first image or the second image;
smoothening the movement detection amount in each of the plurality of image blocks based on differences in the movement detection amount between adjacent blocks of the plurality of blocks so that a smoothened movement detection amount of each pixel is determined;
calculating a movement blending ratio between each pair of the co-located pixels in the image block based on the smoothened movement detection amount of each pixel; and
generating a movement-adaptive image by synthesizing the co-located pixels at the movement blending ratio.

7. An image processing circuit for synthesizing a first image and a second image shot in two or more exposure times, the two or more exposure times being different in length, the first image and the second image being shot in a parallel way within one frame time, the image processing circuit comprising:
a level adjuster configured to adjust a luminance level of the first image and output a corrected first image having a luminance level that is substantially same as a luminance level of the second image;
a movement detector configured to calculate an absolute value of a difference in a pixel value between each pair of co-located pixels in the corrected first image and the second image and accumulate the absolute value on an image block basis, an image block being a plurality of sets of continuous pixels in the corrected first image or the second image to obtain a movement detection amount in each of a plurality of image blocks;
a movement blending ratio calculator configured to smoothen the movement detection amount of each of the plurality of image blocks based on differences in the movement detection amount between adjacent blocks of the plurality of blocks so that a smoothened movement detection amount of each pixel is determined and calculate a movement blending ratio between each pair of the co-located pixels in the image block based on the smoothened movement detection amount of each pixel; and
an image synthesizer configured to generate a movement-adaptive image by synthesizing the co-located pixels at the movement blending ratio.

\* \* \* \* \*